United States Patent
Hai et al.

(10) Patent No.: US 7,617,917 B2
(45) Date of Patent: Nov. 17, 2009

(54) CARRYING CASE FOR PETS

(75) Inventors: Du Hai, Fujian Province (CN); Andrezj M. Redzisz, Wheeling, IL (US)

(73) Assignee: Travel Caddy, Inc., Elk Grove, IL (US)

( * ) Notice: Subject to any disclaimer, the term of this patent is extended or adjusted under 35 U.S.C. 154(b) by 0 days.

(21) Appl. No.: 11/671,554

(22) Filed: Feb. 6, 2007

(65) Prior Publication Data

US 2008/0184941 A1    Aug. 7, 2008

(51) Int. Cl.
*A45C 13/34* (2006.01)
*A45C 13/36* (2006.01)
*A01K 29/00* (2006.01)

(52) U.S. Cl. .................. 190/106; 190/112; 190/127; 119/487

(58) Field of Classification Search .............. 190/108, 190/112, 127, 111, 903, 106; 119/496–498
See application file for complete search history.

(56) References Cited

U.S. PATENT DOCUMENTS

| 4,673,070 A | * | 6/1987 | Ambal | 190/108 |
| 4,977,857 A | * | 12/1990 | Slawinski | 119/497 |
| 5,307,758 A | * | 5/1994 | Ho | 119/497 |
| 6,021,740 A | * | 2/2000 | Martz | 119/497 |
| 6,076,485 A | * | 6/2000 | Peeples et al. | 119/497 |
| 6,155,206 A | * | 12/2000 | Godshaw | 119/453 |
| 6,286,461 B1 | * | 9/2001 | Martz | 119/497 |
| 6,899,057 B1 | * | 5/2005 | Chrisco et al. | 119/498 |
| D523,995 S | * | 6/2006 | Knittle | D30/109 |
| 2002/0139314 A1 | * | 10/2002 | Burns et al. | 119/497 |
| 2003/0127060 A1 | * | 7/2003 | Yeung | 119/497 |
| 2005/0005871 A2 | * | 1/2005 | Farmer et al. | 119/474 |

FOREIGN PATENT DOCUMENTS

JP    2002159235 A   *  6/2002
WO  WO 2004086856 A1 * 10/2004

* cited by examiner

*Primary Examiner*—Sue A Weaver
(74) *Attorney, Agent, or Firm*—Banner & Witcoff, Ltd.

(57) ABSTRACT

A carry bag for pets includes a construction that has a general rectangular, parallelepiped configuration and incorporates first and second mesh flaps which may be folded to provide for easy ingress and egress of a pet from the bag. The flaps are designed to be retained in an open condition by means of magnetic catches. The configuration of the carry bag is designed to enhance the comfort of a pet retained therein.

12 Claims, 11 Drawing Sheets

CARRYING CASE FOR PETS

BACKGROUND OF THE INVENTION

In a principal aspect the present invention relates to a carrying case which is especially useful for the transportation of pets, particularly canine and feline pets.

Many persons while traveling desire to be accompanied by their pet. Cats, dogs and other domestic animals are often considered an essential companion. Various products are available for the housing of such pets during travel. Characteristics associated with such carrying cases include, most importantly, protection for the pet and comfort of the pet when being carried. Additionally, flow of air and light to the carry case or enclosure in which the pet is carried is considered very important. Additionally, the availability of ancillary or complimentary pouches and storage compartments is considered an appropriate feature of such carrying cases for the purpose of including leashes, pet toys, pet food, etc. With all of these considerations, the present carrying case was conceived.

SUMMARY OF THE INVENTION

Briefly, the present invention comprises a soft sided carrying case comprised generally of padded fabric material and which has a generally rectangular parallelepiped shape. The carrying case is thus comprised of first and second spaced sidewalls, a bottom wall, first and second spaced end walls and a top wall. The end walls and a portion of the top wall are comprised of a fabric flap which is attached to the top wall or end wall by a hinge mechanism. The flap is in the form of a mesh material. The free end of the flap hinged to the top wall is attachable to an end wall. A magnetic fastener is included along with a zipper connection. The magnetic fastener enables maintaining the flap in an open condition when desired. The flap associated with the other or opposite end wall is hinged to that end wall and opens to permit the pet to be positioned within the carry bag. This flap, too, is comprised of a mesh material for access to air flow and light. Additionally and optionally, this flap may also incorporate a magnetic latch mechanism which holds the flap in a desired condition. Ancillary pouches are attached to the sidewalls. Handles for carrying the carry case are also attached to the sidewalls. A stiffening member is provided in the bottom wall to maintain the shape of the carry case. One of the end walls typically includes a stiffening member and may also include an arcuately curved border or margin for the pet to rest their head.

Thus, it is an object of the invention to provide a generally rectangular, parallelepiped shaped carry case or bag which serves as a pet transport case.

Another object of the invention is to provide a pet transport carry case which is padded, which includes mesh panels that may be opened to permit ingress and egress of the pet to the case, which is lightweight, which is economical, which includes carry handles as well as ancillary pouches, and which includes necessary reinforcing stiffeners to maintain the configuration of the carry case.

A further object of the invention is to provide a carry case which includes mesh material flaps that may be opened for ingress or egress to the carry case and which may include holding devices such as magnetic catches for maintaining the flaps in a desired position during use of the carry case.

These and other objects, advantages and features of the invention will be set forth in the detailed description which follows.

BRIEF DESCRIPTION OF THE DRAWING

In the detailed description which follows, reference will be made to the drawing comprised of the following figures.

DETAILED DESCRIPTION OF AN EMBODIMENT OF THE INVENTION

Figure 1:
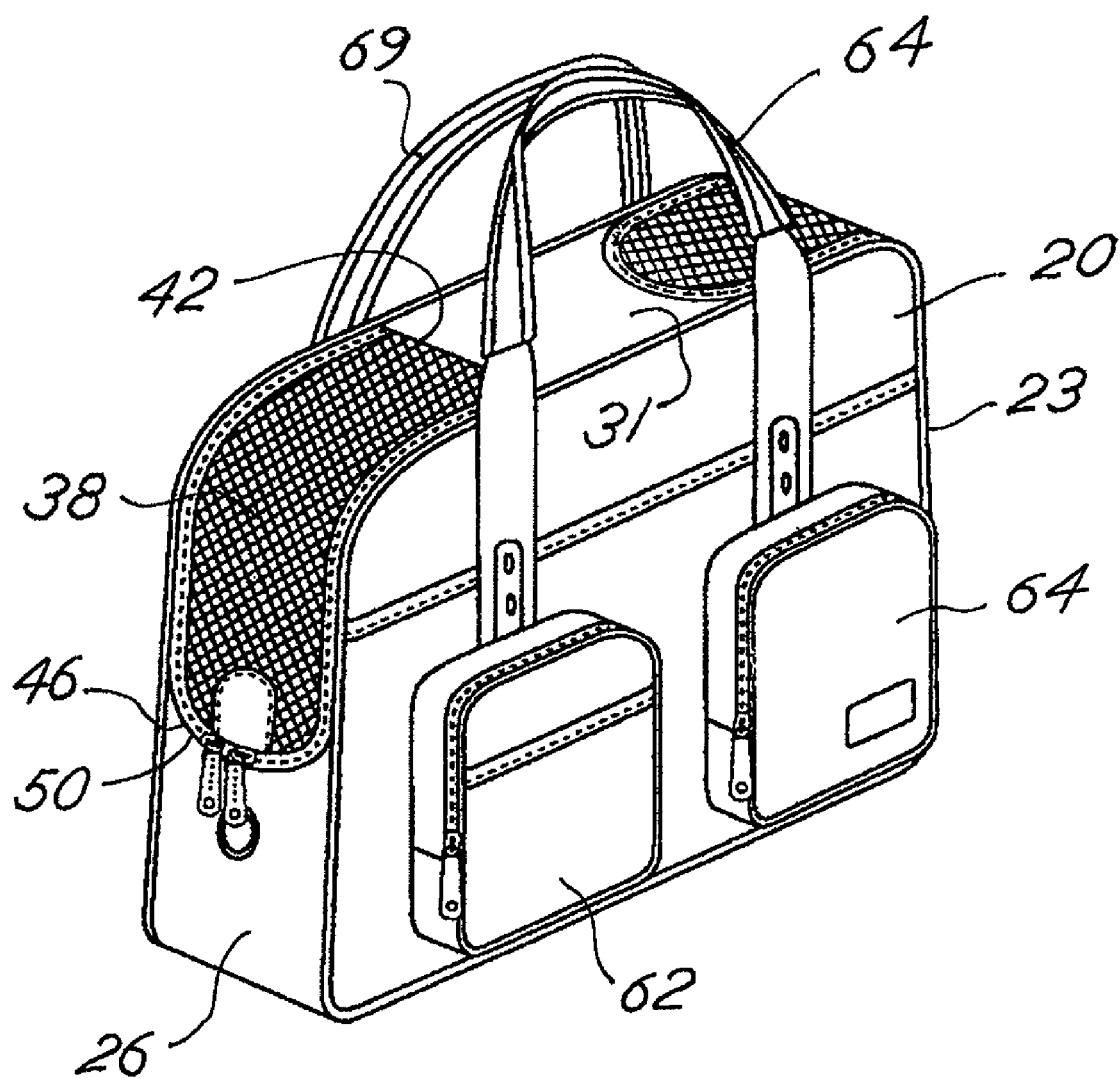
FIG. 1 is an isometric view of an embodiment of the invention as viewed from a first lateral side.

Referring to the figures, the carry case of the invention comprises a generally rectangular parallelepiped shaped bag which includes a first sidewall 20 having a generally rectangular configuration and is spaced from a second generally congruently shaped sidewall 22. The first sidewall 20 and second sidewall 22 are joined to opposite sides of a bottom wall 24 by means of a binding 23, for example, with respect to first sidewall 20. The binding 23 provides a means by which the shape of the walls and, in particular, the first sidewall 20 as well as the bottom wall 24 will be maintained.

The first sidewall 20 and second sidewall 22 are connected by a first end wall 26 and a spaced, generally equally sized, second end wall 28. The sidewalls 20 and 22 are further joined together by a top wall 31. Again, binding associated with the various walls provides a means to join the walls and facilitate maintenance of the shape of the generally parallelepiped storage bag.

Figure 4:
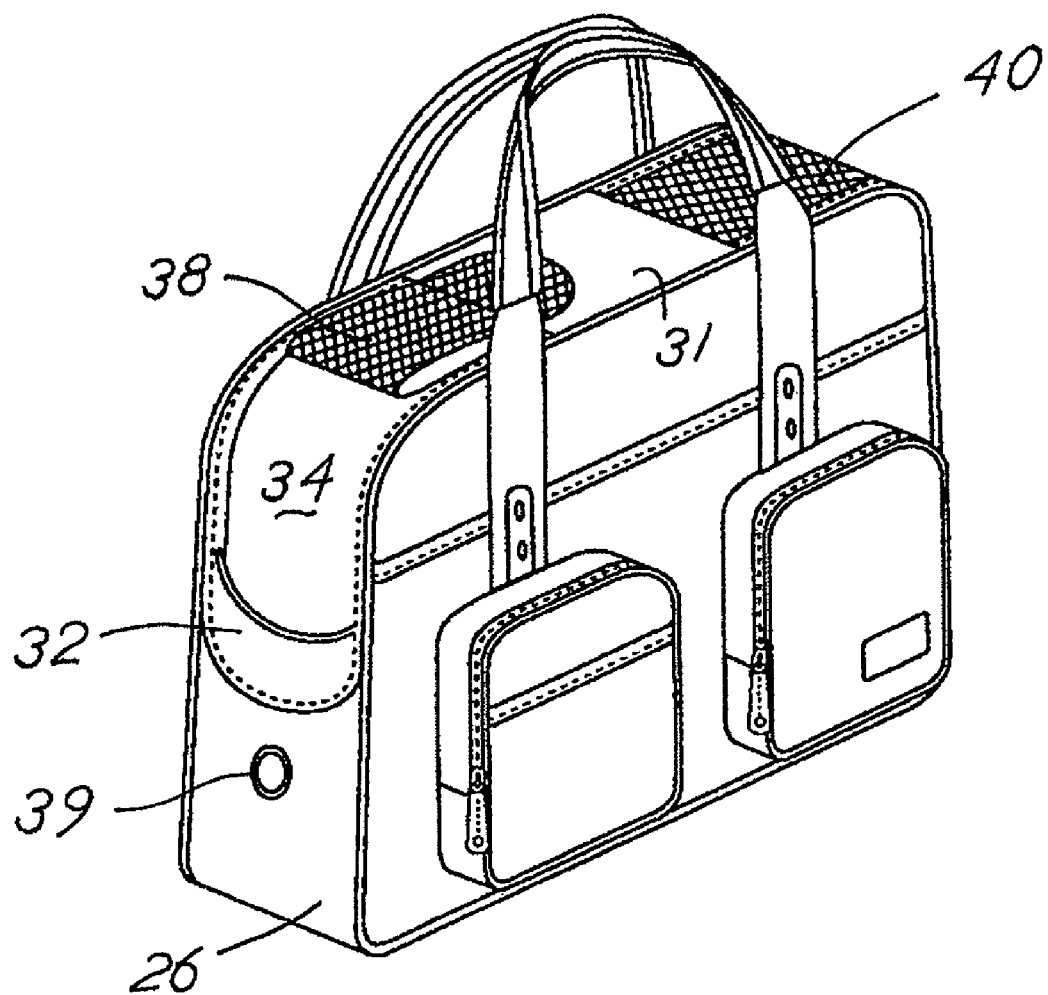
FIG. 4 is an isometric view of the carry case of FIG. 3 wherein the first flap is retained in a desired open position by means of a magnetic catch.

The first end wall 26 has a first passage 34 therethrough. The first passage 34 comprises an opening in the first end wall 26 and the top wall 31. A first mesh closure flap 38 is provided for enclosing the first passage 34. More specifically, the first mesh closure flap 38 is connected to the top wall 31 by a first hinge connection 42. The first hinge connection 42 is approximately ⅓ of the distance inwardly from the plane of the first end wall 26. The first flap 38 may thus be folded over the passage or opening 34. The first flap 38 may be retained closed over the passage 34 by means of a first fastener or zipper mechanism 46. Additionally, the first flap 38 includes a free end 50. A magnetic catch or first retention mechanism 52 is sewn into free end 50. The magnetic catch or first retention mechanism is cooperative with a first compatible retention mechanism 54 sewn into the top wall 31. In this manner, the first flap 38 may be folded, such as depicted in FIG. 4, to permit ingress through the passage 34 to the interior of the carry bag. The first flap 38 is a mesh material which provides for air flow and light access to the interior of the bag. Additionally, an opening 39 in the first sidewall 26 may provide additional means for air flow into the interior of the bag. It is to be noted that the first end wall 26 includes a stiffening panel or stiffening element 32. The stiffening panel or stiffening element 32 is positioned at a margin near the top end of the first end wall 26 and is arcuate or convex in shape so that a pet which is housed within the interior of the bag may rest its head upon that boundary or margin.

Figure 5:
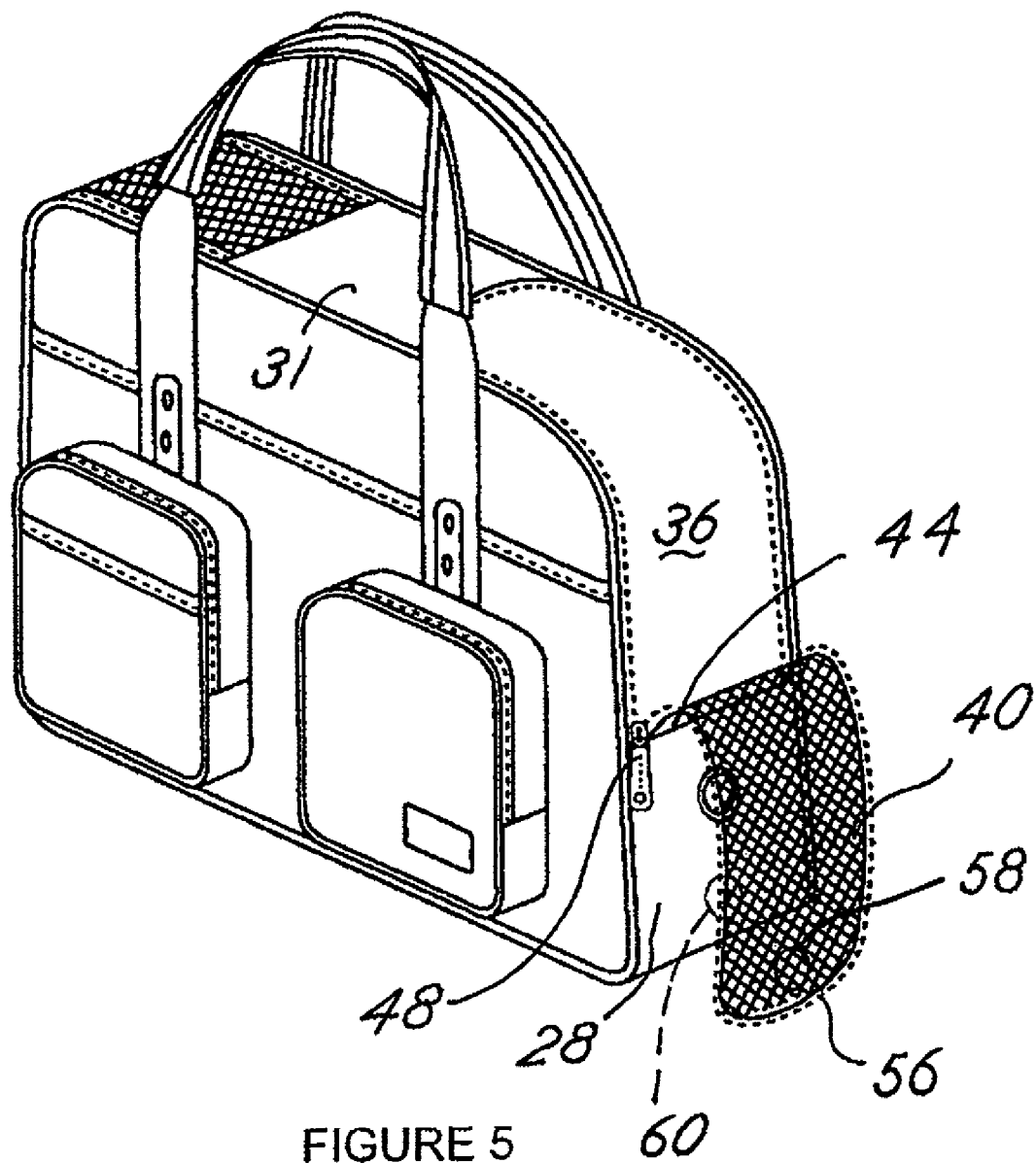
FIG. 5 is an isometric view of the opposite end flap and panel of the carry case illustrating the manner in which a second flap of mesh is affixed thereto and may be opened for ingress to the carry case.

A second flap or second mesh closure flap 40 is positioned in association with the opposite or second end wall 28. The second flap 40 is likewise made from a mesh material. It, however, is hinged as depicted for example in FIG. 5 along a second hinge connection 44 which is approximately midway between the bottom wall 24 and the top wall 31. A second fastener 48; namely, a zipper provides for attachment of the second mesh closure flap 40 to close the second passage 36 to the interior of the bag. The second flap 40 includes a free end 56 analogous to the free end 50 of the first flap 38. The second flap 40 may include a magnetic catch or retention mechanism 58 which will cooperate with a second compatible retention mechanism 60 for holding the flap 40 in the open condition. It is not as necessary to provide the magnetic arrangement for maintaining opening the second flap 40 as it is with respect to the first flap 38 inasmuch as gravity will retain the second flap 40 in position. The free end 56 of the second flap 40 will extend and be connected to the top wall 31 at a distance approximately ⅓ of the distance inwardly from the second end wall 28 toward the first end wall 26 in the top wall 31. This will insure an adequately sized passage 36 for ingress of the pet into the carry bag. Thus, in use, a pet will be placed into the carry bag through the opening or passage 36 and may have an opportunity to view outwardly through the passage 34 while resting their head upon the curved top edge of the end wall 26.

Figure 6:
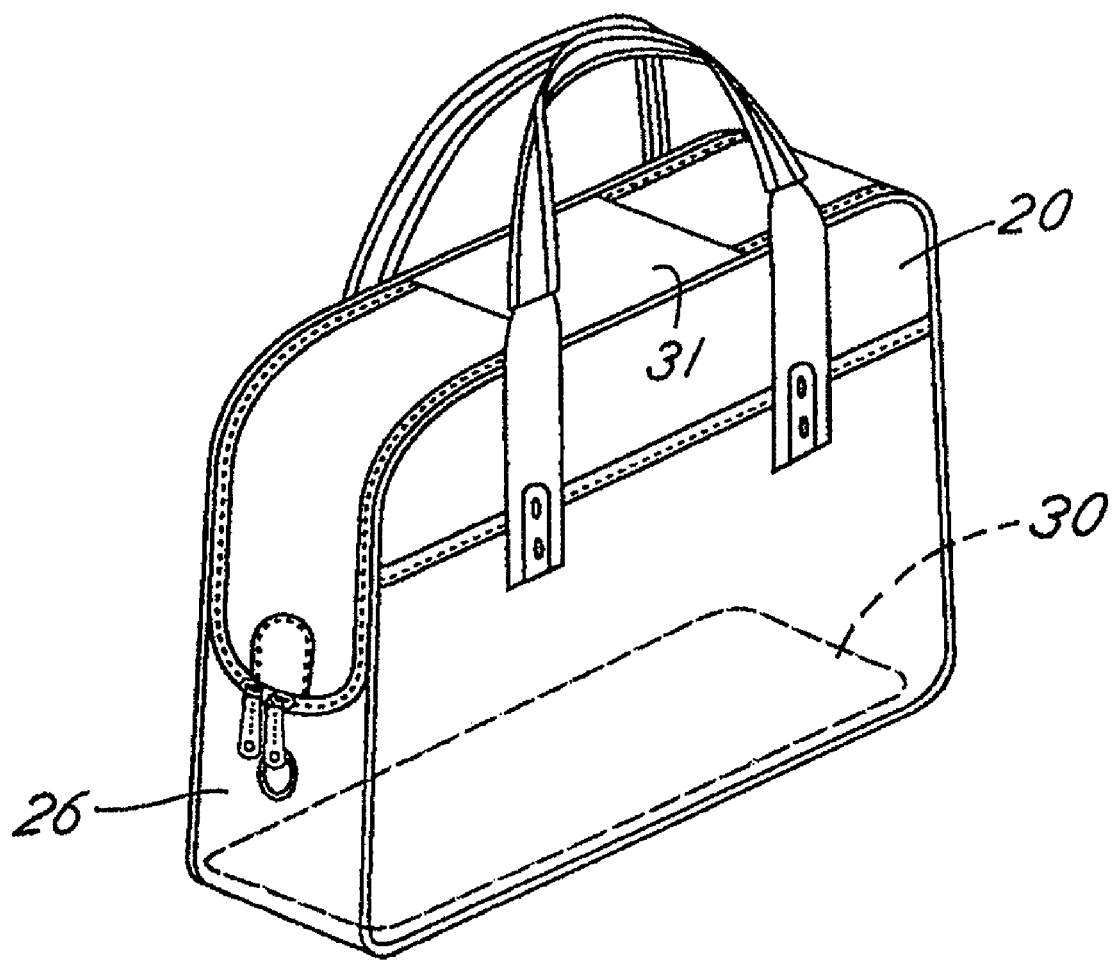
FIG. 6 is an isometric view illustrating a reinforcement or stiffening member associated with the bottom wall of the carry case.
Figure 7:
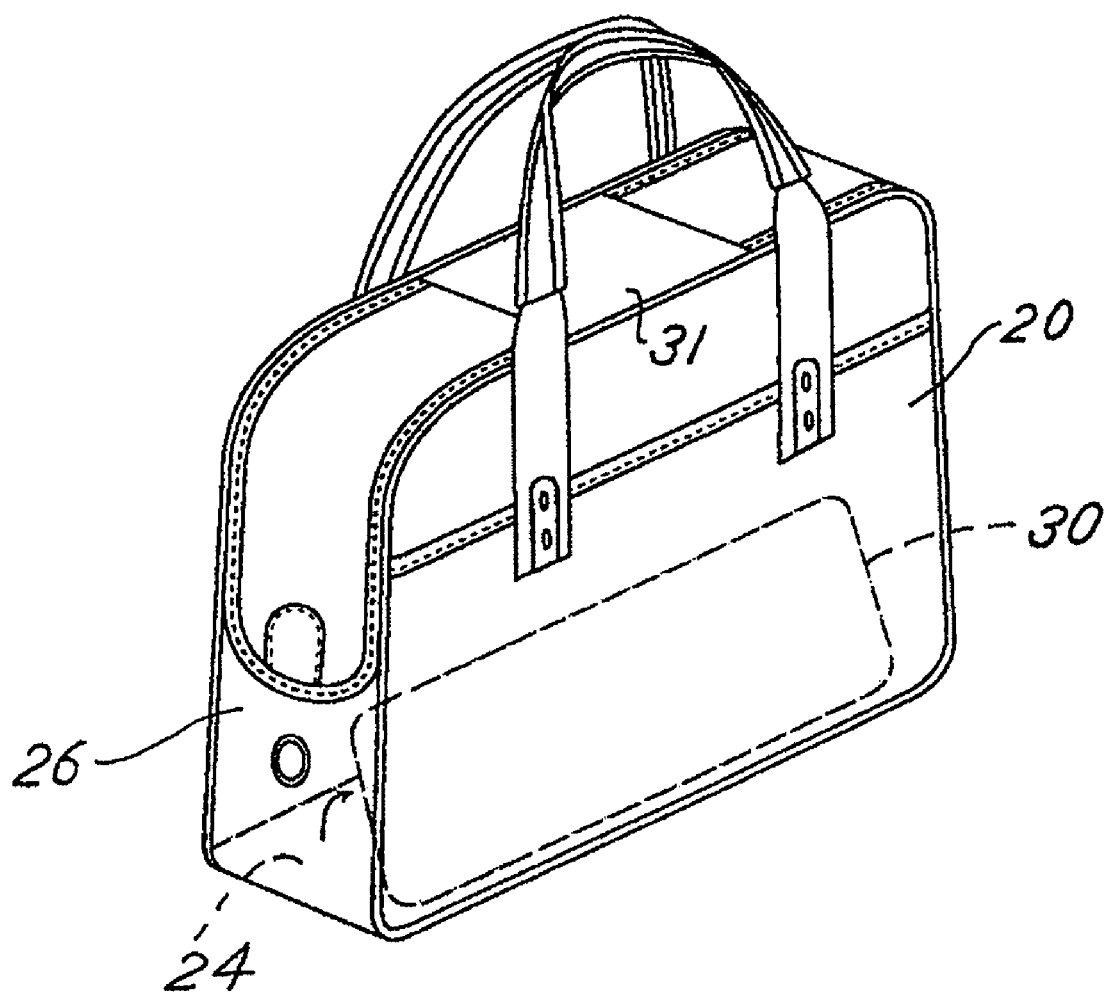
FIG. 7 is an isometric view similar to FIG. 6 further illustrating a stiffening member within the carry case for reinforcing the bottom wall.
Figure 8:
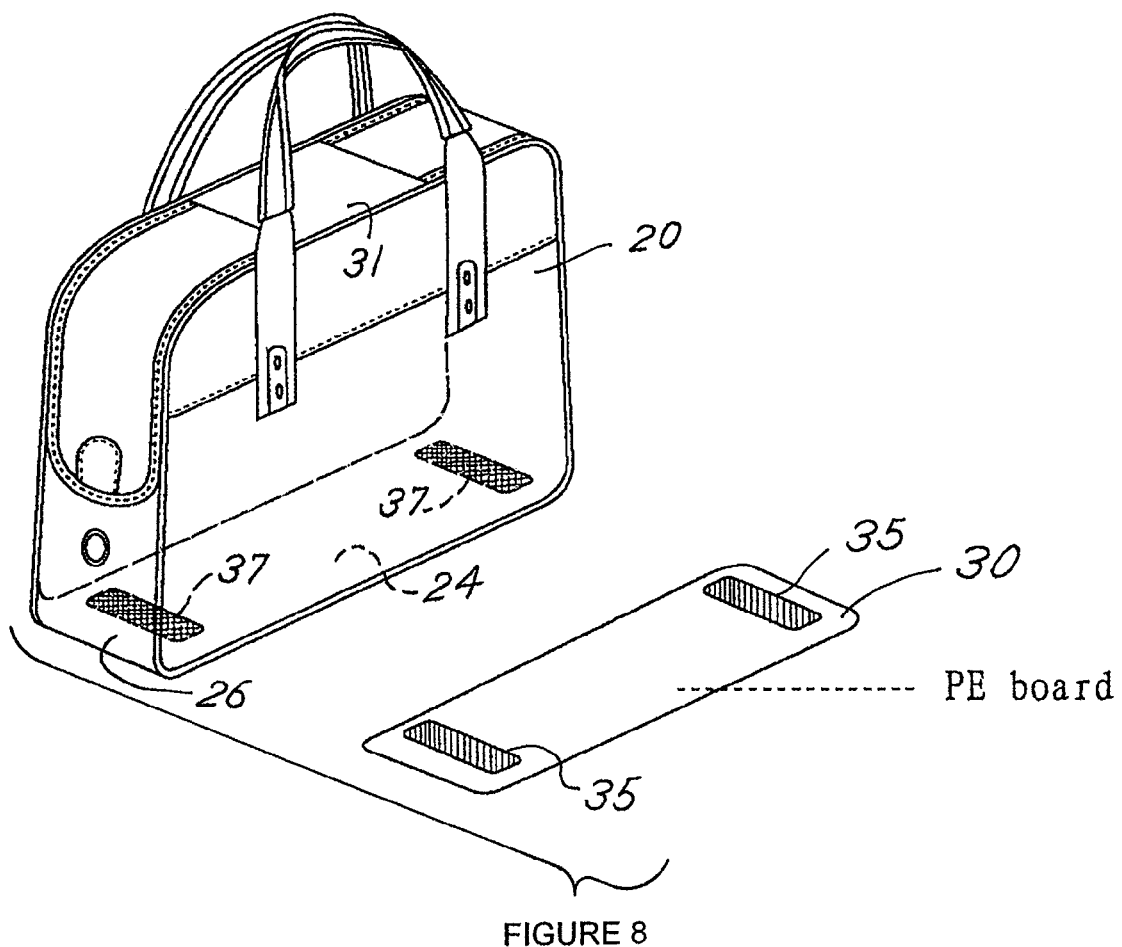
FIG. 8 is an exploded isometric view illustrating the construction of the reinforcing or stiffening element utilized to stiffen the bottom wall of the carry case.

The bottom wall 24 as depicted in FIGS. 6, 7 and 8 includes a stiffening element; namely, a first stiffening element or generally rectangular board, such as a polyethylene board 30, which is shaped or configured to be generally congruent with the bottom side or bottom wall 24 of the bag. The stiffening element 30 or first stiffening element 30 typically is inserted into the carry bag prior to usage. That is, the first stiffening element 30 may include hook and loop fasteners 35 which are cooperative with hook and look fasteners 37 on the inside of the bottom wall 24 to hold the stiffening element 30 in position as illustrated in FIG. 6. In this manner, the configuration of the carry bag is generally maintained in cooperation with the stiffening element 32 associated with the first end wall 26 and the use of a binding material 23, such as previously described.

Figure 2:
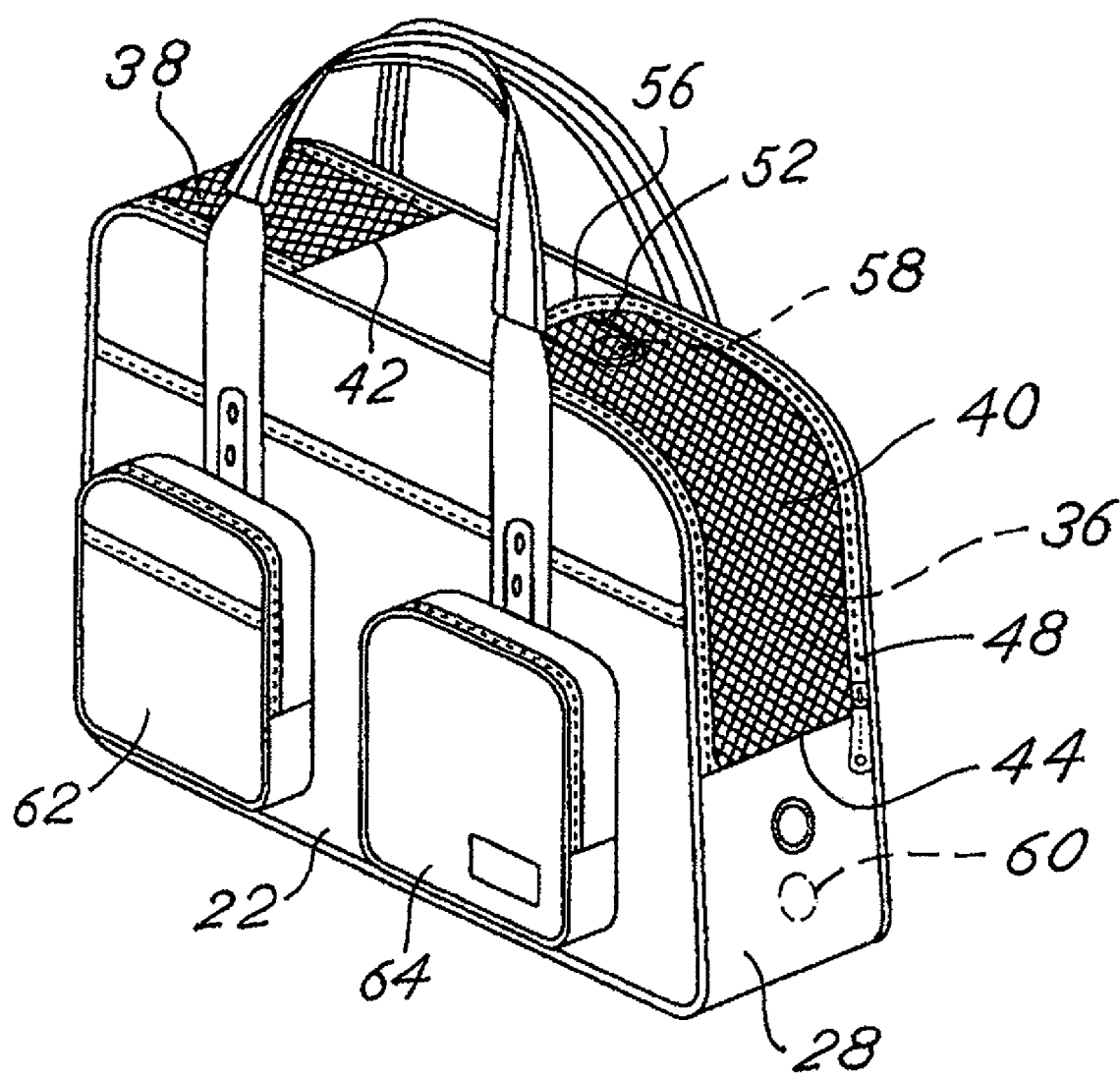
FIG. 2 is an isometric view of the carry case of FIG. 1 as viewed from the opposite lateral side.
Figure 3:
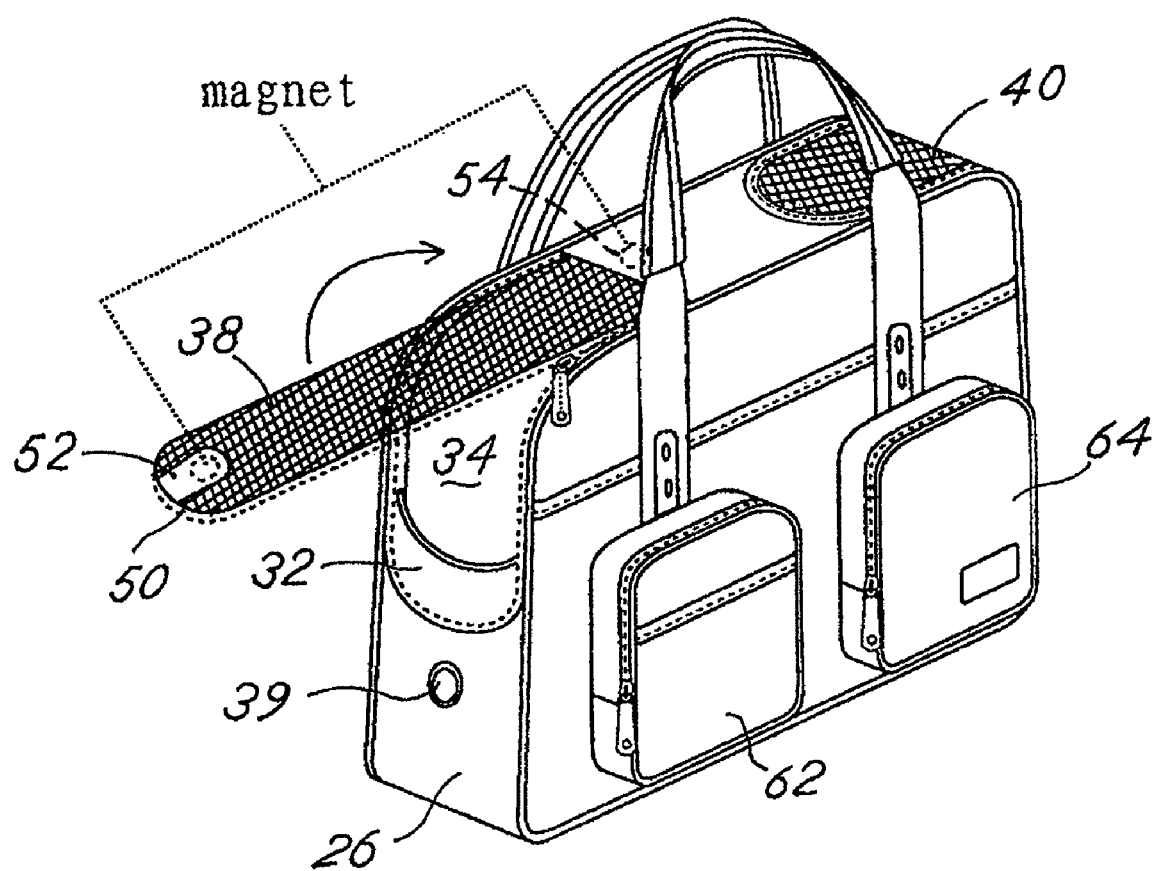
FIG. 3 is an isometric view of the carry case of FIG. 1 depicting a first mesh flap and wherein that flap is open for ingress to the carry case.
Figure 9:
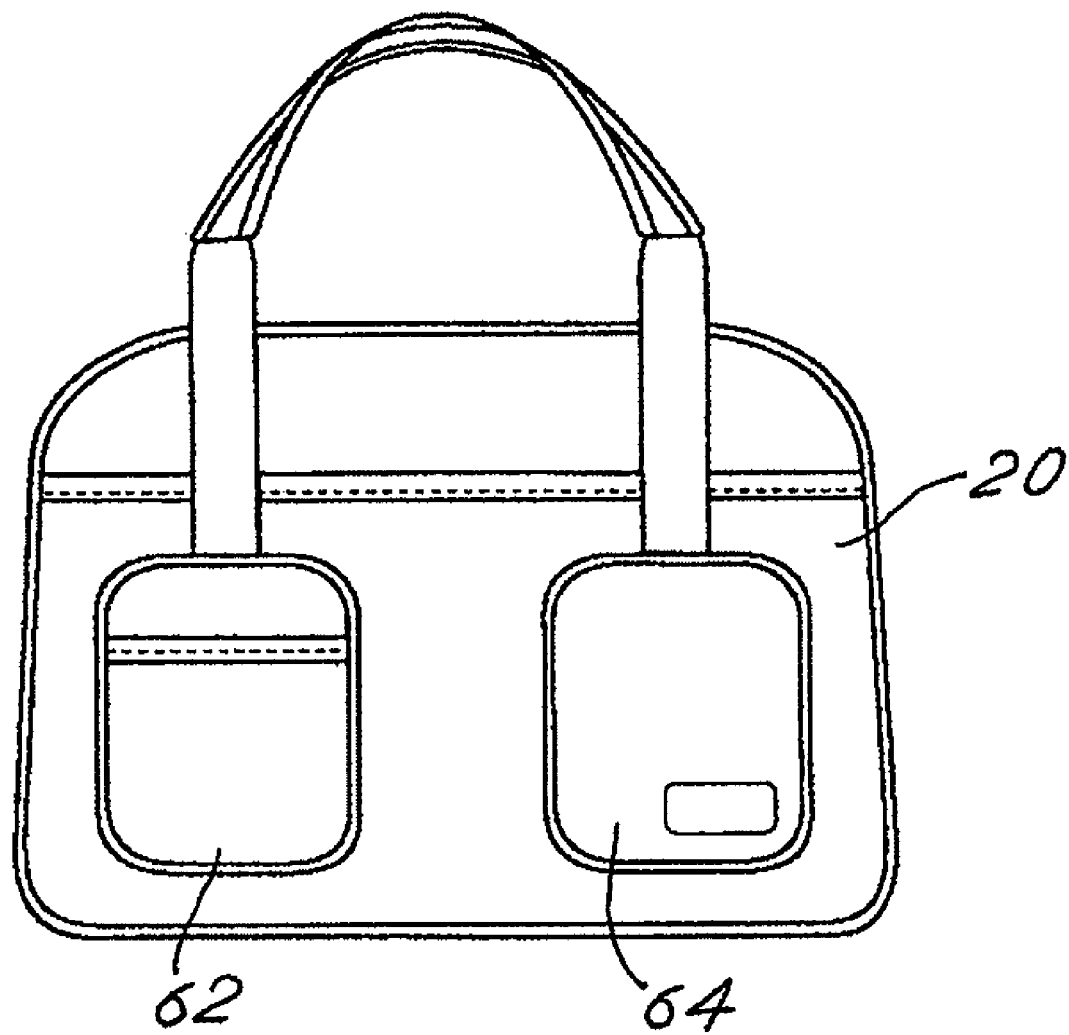
FIG. 9 is a side elevation of the embodiment of FIG. 1.
Figure 10:
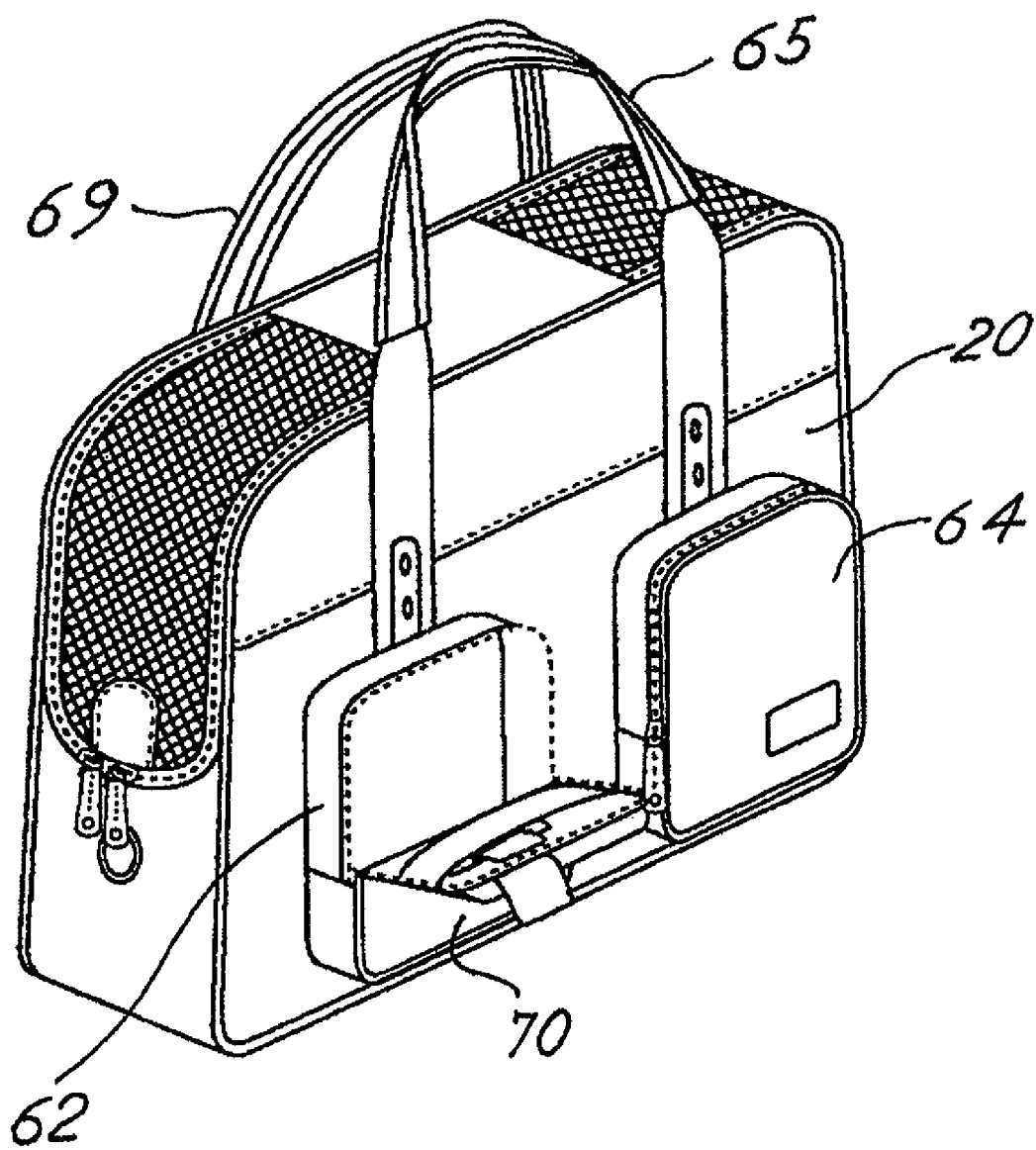
FIG. 10 is an isometric view illustrating the construction of auxiliary or ancillary pouches of the carry case of the embodiment of FIG. 1.
Figure 11:
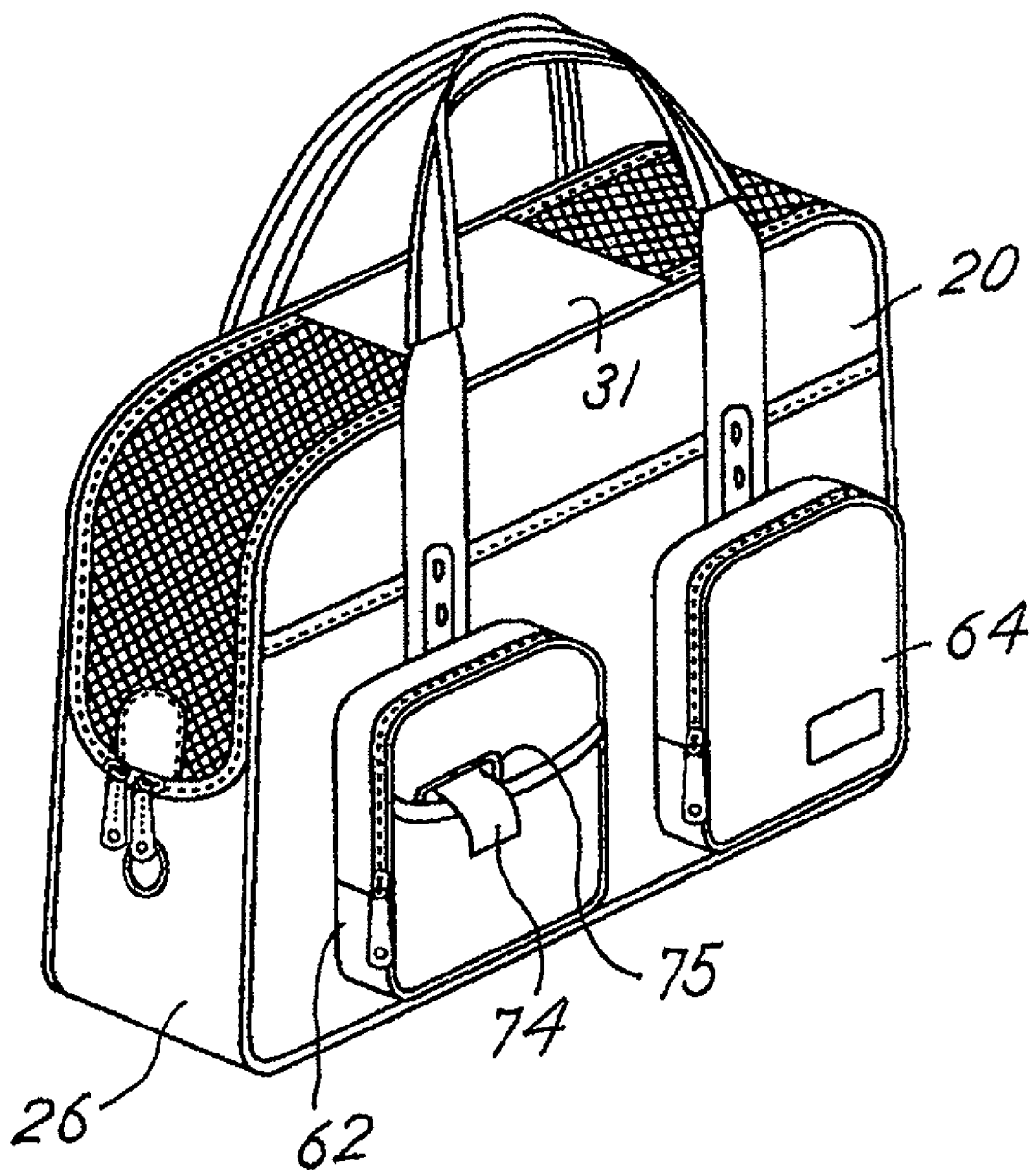
FIG. 11 is a further isometric view illustrating the construction of the ancillary or supplementary outside pouches associated with the embodiment of FIG. 1.

FIGS. 9, 10 and 11 depict another feature of the embodiment of the invention described herein. More particularly, a first storage bag or pouch 62 may be attached to a first sidewall 20. More than one pouch of the nature described may be attached. Additionally, a second pouch 64 may be attached to a second sidewall 22. Referring to FIGS. 9 and 10, a first and second pouch 62 and 64 may be attached to the first sidewall 20. Similar pouches may be attached to the opposite sidewall such as depicted in FIG. 2. Referring to FIG. 10, pouch 62 includes a front flap 68 and a second flap 70 which may be attached by means of a zipper to the pouch 62. Within the pouch 62 and projecting through a side passage in the flap 70 is a leash member 74. That is, a leash 74 may be folded into the pouch 62 and may be extended through a slot 75 in the flap 70 so that the leash 74 may be attached to the collar of a pet. In this manner, the carry bag may remain connected to the leash 74 and the carry bag may be carried while the leashed animal is attached to the leash 74.

The first side 20 further includes a carry handle 65 attached thereto. Similarly, the second side 22 includes a carry handle 69. In this manner, the bag may be easily carried and the pet retained within the bag and thereby easily transported.

Typically, the carry bag is made from a padded fabric material for purposes of maintaining comfort for the pet therein. Preferably, in addition, the first stiffening element 30 is covered by padded material. All of the walls comprising the bag are likewise padded.

Various options and alterations of the construction of the carry bag may be implemented without departing from the spirit and scope of the invention. The embodiment described is thus considered exemplary. The invention, therefore, is to be limited only by the following claims and equivalents thereof.

What is claimed is:

1. A carry case for a pet comprising, in combination:
   a generally rectangular, parallelepiped shaped bag fabricated from a flexible material and including first and second spaced sidewalls;
   first and second spaced end walls joined to and joining the first and second sidewalls;
   a bottom wall joined to and joining the first and second sidewalls and the first and second end walls;
   a top wall generally parallel to and spaced from the bottom wall, said top wall joined to and joining the first and second sidewalls;
   said walls in combination forming an enclosure, said bottom wall including a first stiffening member for maintaining said bottom wall in a generally rectangular configuration, at least one of said end walls including a second stiffening member for maintaining said case in a generally rectangular configuration;
   said first and second end walls each comprised of a panel extending upwardly only partially from the bottom wall toward the top wall, said top wall comprised of a panel extending only partially between the first and second end walls to define a first opening through the first end wall and top wall and a second opening through the second end wall and top wall to the enclosure;
   a first mesh closure flap for the first opening, said first flap hinged by a hinge connection along a top side thereof to the top wall and foldable over the first opening to close the first opening, said first flap including a first fastener for attaching and maintaining the first flap in the closed condition, said first flap including a free end with a first flap retention mechanism cooperative with a first flap compatible retention mechanism on the top wall for holding the first flap in a folded position for access through the first opening to the enclosure; and
   a second mesh closure flap for the second opening, said second closure flap hinged by a second hinge connection along a bottom side of said second flap to the second end wall and foldable over the second opening to close the second opening, said second flap including a free end and a second fastener for attaching and maintaining the second flap in the closed condition.

2. The carry case of claim 1 wherein said free end of said second flap includes a second flap retention mechanism and said second end wall includes a second flap compatible retention mechanism on the second end wall for engaging the second flap retention mechanism to hold the second flap in a folded position for access through the second opening to the enclosure.

3. The carry case of claim 2 wherein the retention mechanisms each comprise a magnetic catch.

4. The carry case of claim 2 wherein the second end wall compatible retention mechanism is positioned approximately midway between the bottom wall and the hinge connection in the second end wall whereby the second flap projects at least partially into the second opening when detached, folded and retained by the second flap retention mechanism.

5. The carry case of claim 2 wherein the second flap free end is attachable to the top wall at a location approximately one third of the distance between the second and first end walls.

6. The carry case of claim 1 wherein the retention mechanisms comprise a magnetic catch.

7. The carry case of claim 1 including at least one storage bag attached to at least one sidewall.

8. The carry case of claim 7 further including a second storage bag on one of said side walls.

9. The carry case of claim 1 wherein said first and second fasteners comprise a zipper mechanism.

10. The carry case of claim 1 wherein the compatible retention mechanism is located in the top wall approximately midway between the first and second end walls.

11. The carry case of claim 10 wherein the first end wall extends approximately one half of the distance between the bottom wall and the top wall and includes the second stiffening member.

12. The carry case of claim 11 wherein the first end wall includes a convex curved upper end and the second stiffening member for the first end wall is located generally at an upper end margin.

* * * * *